United States Patent
Yoshizaki et al.

(10) Patent No.: US 10,991,176 B2
(45) Date of Patent: Apr. 27, 2021

(54) DRIVERLESS TRANSPORTATION SYSTEM

(71) Applicant: TOYOTA JIDOSHA KABUSHIKI KAISHA, Toyota (JP)

(72) Inventors: Yasunao Yoshizaki, Okazaki (JP); Koji Taguchi, Sagamihara (JP); Masaki Wasekura, Toyota (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 16/135,129

(22) Filed: Sep. 19, 2018

(65) Prior Publication Data
US 2019/0147671 A1    May 16, 2019

(30) Foreign Application Priority Data
Nov. 16, 2017   (JP) ............................. JP2017-220982

(51) Int. Cl.
*B60W 10/30* (2006.01)
*B60W 10/04* (2006.01)
(Continued)

(52) U.S. Cl.
CPC ......... *G07C 5/0816* (2013.01); *G07C 5/0891* (2013.01); *B60W 10/04* (2013.01);
(Continued)

(58) Field of Classification Search
CPC .... G07C 5/0816; G07C 5/0891; G07C 5/008; B60W 10/04; B60W 10/30; B60W 2420/42
See application file for complete search history.

(56) References Cited

U.S. PATENT DOCUMENTS 5,798,714 A * 8/1998 Nyfelt ................. B60R 25/1012
340/988
10,534,819 B2 * 1/2020 Ricci ....................... B60Q 9/00
(Continued)

FOREIGN PATENT DOCUMENTS

JP    2003317177 A    11/2003
JP    2014164638 A    9/2014
(Continued)

*Primary Examiner* — Yazan A Soofi
*Assistant Examiner* — Naeem Taslim Alam
(74) *Attorney, Agent, or Firm* — Sughrue Mion, PLLC

(57) ABSTRACT

A driverless transportation system includes an autonomous driving vehicle and a management server. A check code includes: a vehicle code unique to the autonomous driving vehicle; and a passcode whose value changes each time it is generated. In deactivation processing, the autonomous driving vehicle newly generates the passcode, stores the check code including the newly-generated passcode, as a first check code, and transmits the first check code to the management server. The management server stores the first check code as a stored check code. In order to activate the autonomous driving vehicle, the management server transmits an activation instruction and the stored check code to the autonomous driving vehicle. In response to that, the autonomous driving vehicle reads the check code from its memory device, as a second check code, and determines whether or not the second check code and the stored check code match.

5 Claims, 18 Drawing Sheets

(51) Int. Cl.
    *G07C 5/08*         (2006.01)
    *G07C 5/00*         (2006.01)

(52) U.S. Cl.
    CPC ......... *B60W 10/30* (2013.01); *B60W 2420/42* (2013.01); *G07C 5/008* (2013.01)

(56) References Cited

U.S. PATENT DOCUMENTS

| | | | |
|---|---|---|---|
| 2006/0215884 A1* | 9/2006 | Ota | B60R 25/252 382/118 |
| 2013/0027556 A1* | 1/2013 | Clark | G08B 21/24 348/148 |
| 2015/0221150 A1* | 8/2015 | Frykman | B60R 25/24 340/5.21 |
| 2016/0300410 A1* | 10/2016 | Jones | G06K 9/00348 |
| 2016/0318481 A1* | 11/2016 | Penilla | B60L 53/68 |
| 2017/0123423 A1* | 5/2017 | Sako | G05D 1/0088 |
| 2018/0012433 A1* | 1/2018 | Ricci | B60L 53/00 |
| 2018/0162415 A1* | 6/2018 | Song | B60W 50/00 |
| 2018/0211543 A1* | 7/2018 | Wei | G06Q 10/0833 |
| 2018/0321688 A1* | 11/2018 | Chase | G06Q 50/30 |
| 2019/0057264 A1* | 2/2019 | Schmidt | G05D 1/0061 |
| 2020/0201959 A1* | 6/2020 | Takemori | H04L 9/0863 |

FOREIGN PATENT DOCUMENTS

| | | |
|---|---|---|
| JP | 2015-191264 A | 11/2015 |
| JP | 2016006603 A | 1/2016 |
| JP | 2016203886 A | 12/2016 |

* cited by examiner

1: DRIVERLESS TRANSPORTATION SYSTEM

DRIVERLESS TRANSPORTATION SYSTEM

BACKGROUND

Technical Field

The present disclosure relates to an autonomous driving vehicle and a driverless transportation system that provide a driverless transportation service.

Background Art

Patent Literature 1 discloses a driverless transportation service using an autonomous driving vehicle that is capable of driving without a human driver. The autonomous driving vehicle heads to a pickup location for picking up a user. On arriving at the pickup location, the autonomous driving vehicle stops and opens a door. The user gets in the autonomous driving vehicle and performs an authentication operation. When the authentication of the user is completed, the autonomous driving vehicle closes the door and locks the door. After that, the autonomous driving vehicle departs and autonomously travels toward a destination desired by the user.

LIST OF RELATED ART

Patent Literature 1: Japanese Laid-Open Patent Publication No. 2015-191264

SUMMARY

At a standby position, an autonomous driving vehicle providing a driverless transportation service performs deactivation processing to enter a standby mode. In order to activate the autonomous driving vehicle, a management server managing the autonomous driving vehicle transmits an activation instruction to the autonomous driving vehicle.

In this regard, the inventors of the present application have recognized the following problem. That is, there is a possibility that an abnormal event occurs in the autonomous driving vehicle during a standby period from the deactivation to the activation of the autonomous driving vehicle. The abnormal event is exemplified by hacking, unauthorized driving, car break-in, modification, destruction, and so forth. In the case of the driverless transportation service, however, no driver boards the autonomous driving vehicle and thus the abnormal event is not detected by a driver at the time of the activation of the autonomous driving vehicle. Therefore, there is a possibility that the autonomous driving vehicle in which the abnormal event occurs starts autonomous travel, for example, in order to pick up a user. This causes decrease in confidence in the driverless transportation service and deteriorates usefulness of the driverless transportation service.

An object of the present disclosure is to provide a technique that can detect the abnormal event that occurs in the autonomous driving vehicle during the standby period, with regard to the driverless transportation service.

A first disclosure provides a driverless transportation system that provides a driverless transportation service.

The driverless transportation system includes:
an autonomous driving vehicle including a memory device; and
a management server managing the autonomous driving vehicle.

A check code includes:
a vehicle code unique to the autonomous driving vehicle; and
a passcode whose value changes each time it is generated.

In deactivation processing to enter a standby mode, the autonomous driving vehicle newly generates the passcode, stores the check code including the newly-generated passcode, as a first check code, in the memory device, and further transmits the first check code to the management server. The management server stores the first check code as a stored check code.

At a time of activating the autonomous driving vehicle, the management server transmits an activation instruction and the stored check code to the autonomous driving vehicle. In response to the activation instruction, the autonomous driving vehicle reads the check code stored in the memory device, as a second check code, and determines whether or not the second check code and the stored check code match. The autonomous driving vehicle performs first abnormality handling processing when the second check code and the stored check code do not match.

A second disclosure further has the following feature in addition to the first disclosure.

Check information includes at least one of position-orientation information indicating a position and an orientation of the autonomous driving vehicle, driving history information indicating a driving history of the autonomous driving vehicle, and surroundings image information indicating an image around the autonomous driving vehicle.

In the deactivation processing, the autonomous driving vehicle newly acquires the check information as first check information, and transmits the first check information to the management server. The management server stores the first check information as stored check information.

In response to the activation instruction, the autonomous driving vehicle newly acquires the check information as second check information, and transmits the second check information to the management server. The management server compares the second check information with the stored check information to determine whether or not the autonomous driving vehicle is driven without permission. The management server performs second abnormality handling processing when determining that the autonomous driving vehicle is driven without permission.

A third disclosure further has the following feature in addition to the second disclosure.

The check information further includes vehicle image information indicating at least one of images of a room and appearance of the autonomous driving vehicle.

The management server compares the vehicle image information included in the second check information with the vehicle image information include in the stored check information to determine whether or not a change occurs in the room or the appearance of the autonomous driving vehicle. The management server performs third abnormality handling processing when determining that the change occurs.

A fourth disclosure further has the following feature in addition to the first disclosure.

Check information includes vehicle image information indicating at least one of images of a room and appearance of the autonomous driving vehicle.

In the deactivation processing, the autonomous driving vehicle newly acquires the check information as a first check information, and transmits the first check information to the management server. The management server stores the first check information as a stored check information.

In response to the activation instruction, the autonomous driving vehicle newly acquires the check information as a second check information, and transmits the second check information to the management server. The management server compares the second check information with the stored check information to determine whether or not a change occurs in the room or the appearance of the autonomous driving vehicle. The management server performs third abnormality handling processing when determining that the change occurs.

According to the present disclosure, in the deactivation processing, a new check code (i.e. the first check code) is generated and stored in both the autonomous driving vehicle and the management server. After that, at the time of activating the autonomous driving vehicle, the check code (i.e. the second check code) stored in the autonomous driving vehicle and the check code (i.e. the stored check code) stored in the management server are compared with each other.

If the second check code does not match the stored check code, it means that some kind of abnormal event occurs during the standby period. By comparing the second check code and the stored check code, it is possible to detect occurrence of the abnormal event.

Moreover, each check code includes two types of codes with different properties, that is, the vehicle code unique to the autonomous driving vehicle and the passcode whose value changes each time it is generated. Even if the vehicle code is leaked out, it is extremely difficult to know the latest passcode generated immediately before the deactivation. By using both the vehicle code and the passcode with different properties, it is possible to improve accuracy of detection of occurrence of the abnormal event.

According to the present disclosure, as described above, it is possible to detect the abnormal event that occurs in the autonomous driving vehicle during the standby period. This contributes to increase in confidence in the driverless transportation service. Moreover, deterioration of usefulness of the driverless transportation service is prevented.

EMBODIMENTS

Embodiments of the present disclosure will be described below with reference to the attached drawings.

1. Driverless Transportation System

Figure 1:
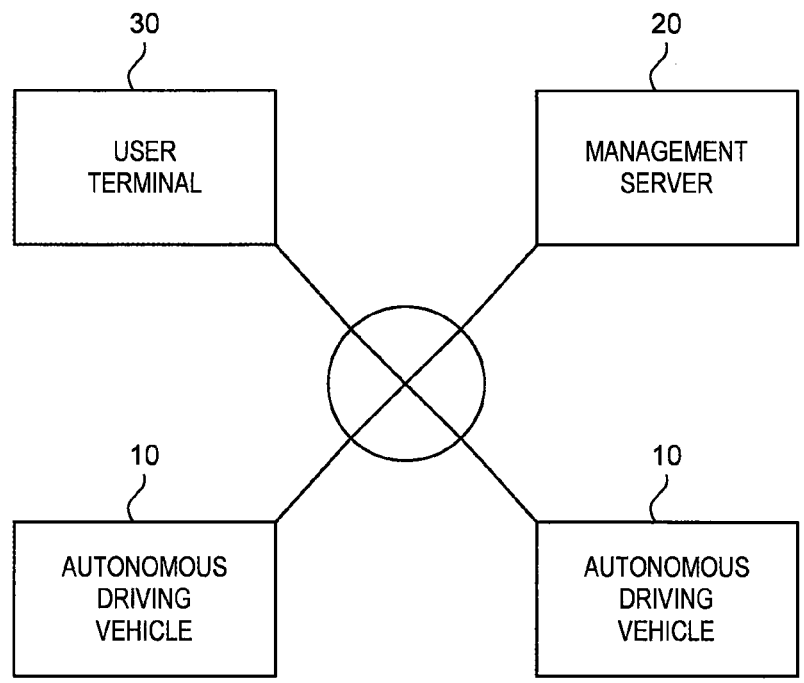
FIG. 1 is a block diagram schematically showing a configuration of a driverless transportation system according to an embodiment of the present disclosure.

FIG. 1 is a block diagram schematically showing a configuration of a driverless transportation system 1 according to the present embodiment. The driverless transportation system 1 provides a driverless transportation service for a user. The driverless transportation system 1 includes an autonomous driving vehicle 10, a management server 20, and a user terminal 30.

The autonomous driving vehicle 10 is capable of autonomous driving without a human driver. The user rides the autonomous driving vehicle 10 and the autonomous driving vehicle 10 provides the driverless transportation service for the user. The autonomous driving vehicle 10 is capable of communicating with the management server 20 and the user terminal 30 through a communication network.

The management server 20 is a server that manages the driverless transportation service and the autonomous driving vehicle 10. The management server 20 is provided with at least a processor, a memory device, and a communication device, and thus is capable of performing a variety of information processing and communication processing. For example, the management server 20 manages registration information of the user and an operating state of the autonomous driving vehicle 10. Moreover, the management server 20 is capable of communicating with the autonomous driving vehicle 10 and the user terminal 30 through the communication network.

The user terminal 30 is a terminal carried by the user. The user terminal 30 is capable of communicating with the autonomous driving vehicle 10 and the management server 20 through the communication network. Such the user terminal 30 is exemplified by a smartphone.

A basic flow of the driverless transportation service is as follows.

First, the user uses the user terminal 30 to send a dispatch request. The dispatch request includes a pickup location desired by the user, and so forth. The dispatch request is transmitted to the management server 20 through the communication network. The management server 20 selects an autonomous driving vehicle 10 that provides the service for the user, and transmits information of the dispatch request to the selected autonomous driving vehicle 10. The autonomous driving vehicle 10 receiving the information automatically heads to the pickup location.

The autonomous driving vehicle 10 arrives at the pickup location and stops. The user boards the autonomous driving vehicle 10. The user notifies the autonomous driving vehicle 10 of a desired destination (drop-off location). Alternatively, the information of the destination may be included in the dispatch request. The autonomous driving vehicle 10 locks a door and then autonomously travels toward the destination. The autonomous driving vehicle 10 arrives at the destination and stops. The autonomous driving vehicle 10 unlocks the door and the user gets off the autonomous driving vehicle 10.

2. Abnormal Event in Standby Mode

Figure 2:
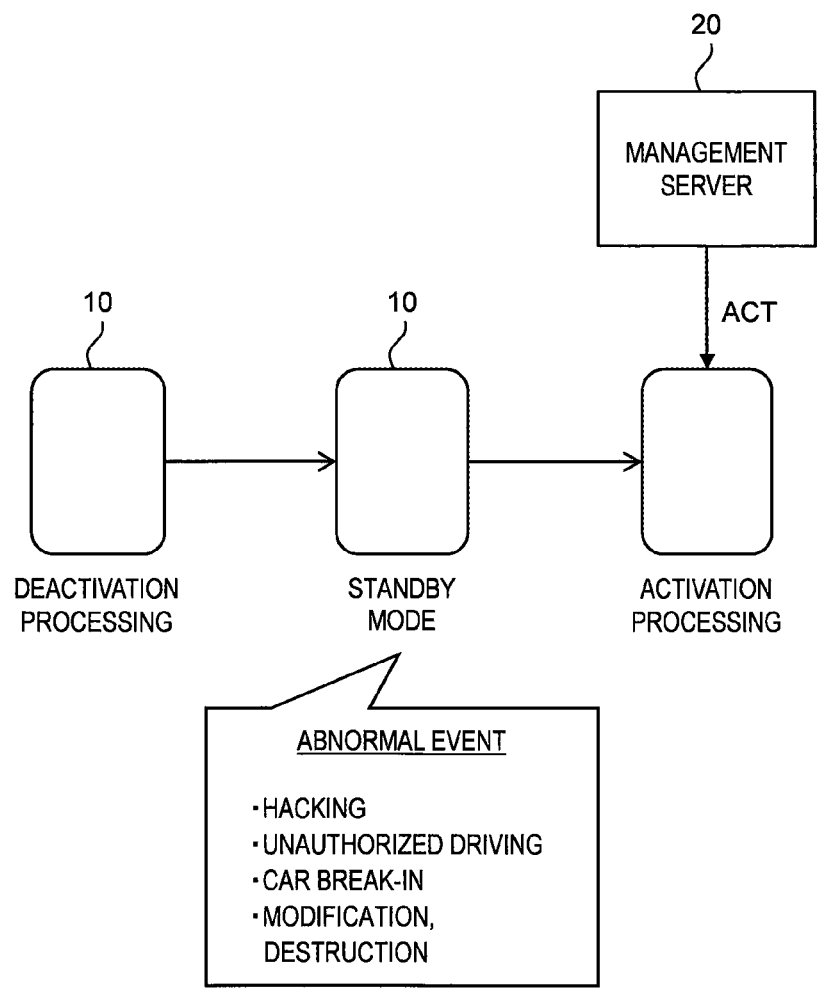
FIG. 2 is a conceptual diagram for explaining a standby mode of an autonomous driving vehicle according to the embodiment of the present disclosure.

FIG. 2 is a conceptual diagram for explaining a standby mode of the autonomous driving vehicle 10 according to the present embodiment. When arriving at a standby position, the autonomous driving vehicle 10 deactivates its operation and enters the standby mode. The standby position is exemplified by a predetermined parking area, the pickup location for picking up the user, and so forth. Processing that the autonomous driving vehicle 10 performs to enter the standby mode is hereinafter referred to as "deactivation processing". For example, the deactivation processing includes turning OFF ignition.

In order to activate the autonomous driving vehicle 10 in the standby mode, the management server 20 transmits an activation instruction ACT to the autonomous driving vehicle 10. In response to the activation instruction ACT, the autonomous driving vehicle 10 performs "activation processing". For example, the activation processing includes turning ON ignition. A period from the deactivation to the activation of the autonomous driving vehicle 10 is hereinafter referred to as a "standby period".

There is a possibility that an "abnormal event" occurs in the autonomous driving vehicle 10 during the standby period. The abnormal event is exemplified by hacking, unauthorized driving, car break-in, modification, destruction, and so forth. In the case of the driverless transportation service, however, no driver boards the autonomous driving vehicle 10 and thus the abnormal event is not detected by a driver at the time of the activation of the autonomous driving vehicle 10. Therefore, there is a possibility that the autonomous driving vehicle 10 in which the abnormal event occurs starts the autonomous travel, for example, in order to pick up the user. This causes decrease in confidence in the driverless transportation service and deteriorates usefulness of the driverless transportation service.

It is therefore desirable to detect the abnormal event that occurs in the autonomous driving vehicle 10 during the standby period. Hereinafter, various embodiments for detecting the abnormal event that occurs in the autonomous driving vehicle 10 during the standby period will be described.

3. First Embodiment

3-1. Outline

Figure 3:
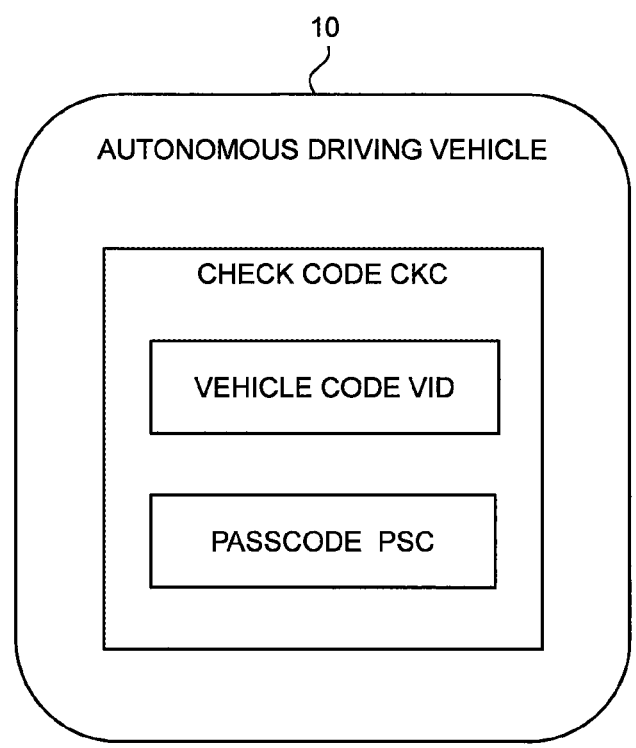
FIG. 3 is a conceptual diagram for explaining a check code in a first embodiment of the present disclosure.

In the first embodiment, a "check code CKC" is used for detecting the abnormal event. FIG. 3 is a conceptual diagram for explaining the check code CKC. The check code CKC includes a vehicle code VID and a passcode PSC. The vehicle code VID is an identification number unique to the autonomous driving vehicle 10. On the other hand, the passcode PSC is a cryptography key whose value changes each time it is generated. The check code CKC is stored (held) in a memory device of the autonomous driving vehicle 10.

Figure 4:
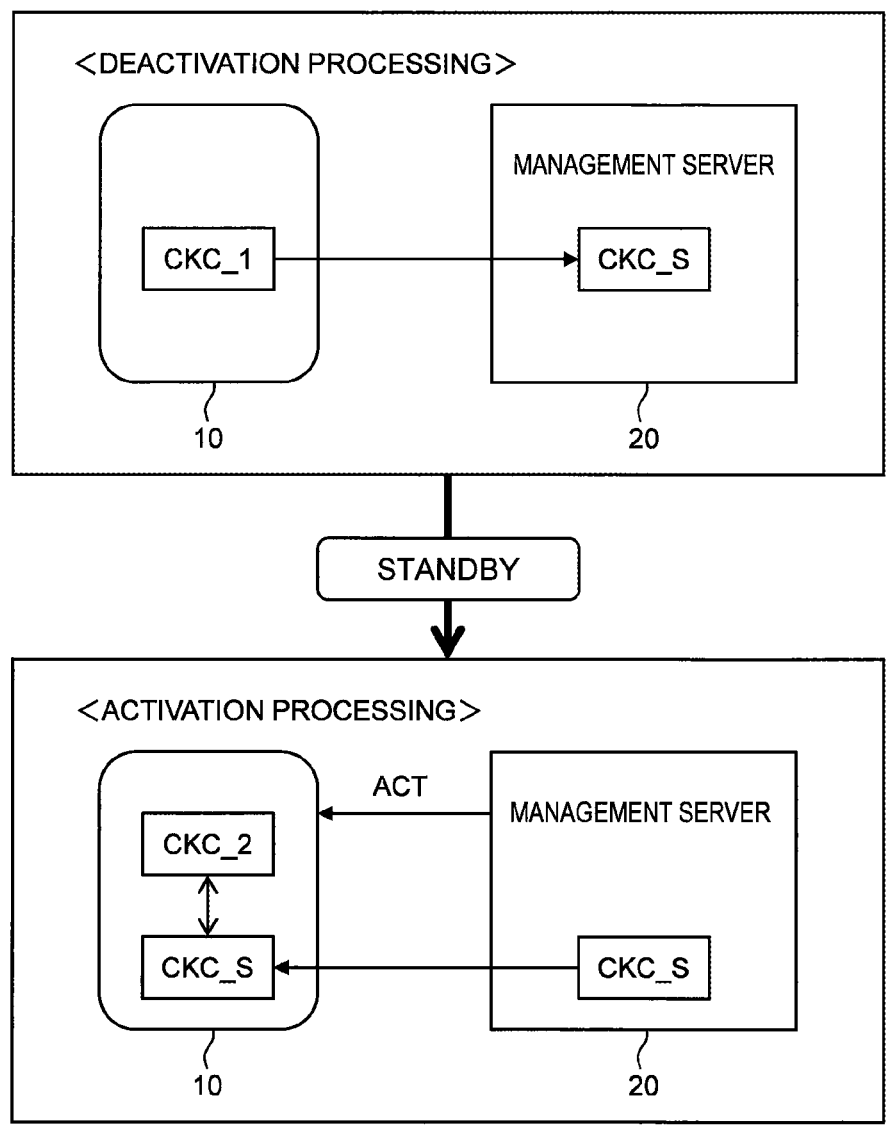
FIG. 4 is a conceptual diagram for explaining an outline of the first embodiment of the present disclosure.

FIG. 4 is a conceptual diagram for explaining an outline of the first embodiment. In the deactivation processing, the autonomous driving vehicle 10 newly generates the passcode PSC. The latest check code CKC including the newly-generated passcode PSC is hereinafter referred to as a "first check code CKC_1". The autonomous driving vehicle 10 not only stores the first check code CKC_1 in the memory device but also transmits the first check code CKC_1 to the management server 20. The management server 20 stores the first check code CKC_1 received from the autonomous driving vehicle 10, as a "stored check code CKC_S".

At the time of activating the autonomous driving vehicle 10, the management server 20 transmits not only the activation instruction ACT but also the stored check code CKC_S to the autonomous driving vehicle 10. In response to the activation instruction ACT, the autonomous driving vehicle 10 performs the activation processing. In the activation processing, the autonomous driving vehicle 10 performs "abnormal event check processing" that checks whether or not any abnormal event occurs during the standby period. More specifically, the autonomous driving vehicle 10 reads the check code CKC stored in the memory device. The check code CKC read from the memory device at this timing is hereinafter referred to as "second check code CKC_2".

The autonomous driving vehicle 10 determines whether or not the second check code CKC_2 and the stored check code CKC_S received from the management server 20 match. Basically, it is expected that the second check code CKC_2 remains the first check code CKC_1 and thus matches the stored check code CKC_S. If the second check code CKC_2 does not match the stored check code CKC_S, it means that some kind of abnormal event occurs during the standby period.

Therefore, when the second check code CKC_2 and the stored check code CKC_S do not match, the autonomous driving vehicle 10 determines that the abnormal event occurs during the standby period. In this case, the autonomous driving vehicle 10 performs predetermined abnormality handling processing (first abnormality handling processing). For example, the autonomous driving vehicle 10 prohibits the activation and notifies the management server 20 of the occurrence of the abnormal event. The management server 20 reports the occurrence of the abnormal event to an operator, a security guard, and the like to urge them to deal with the abnormal event.

According to the first embodiment, as described above, it is possible by using the check code CKC to detect the abnormal event that occurs during the standby period. Hereinafter, an example of a configuration of and processing by the autonomous driving vehicle 10 according to the first embodiment will be described in detail.

3-2. Configuration Example of Autonomous Driving Vehicle

Figure 5:
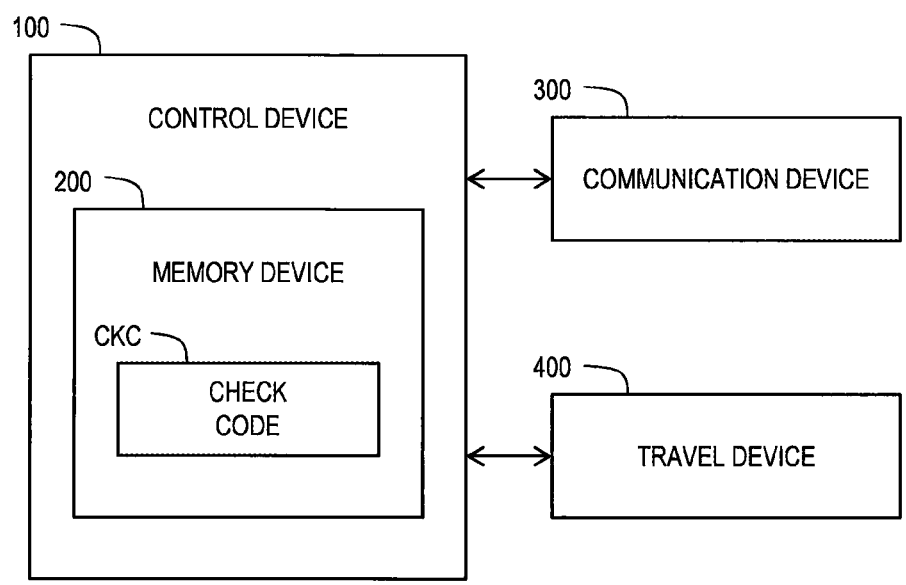
FIG. 5 is a block diagram showing a configuration example of the autonomous driving vehicle according to the first embodiment of the present disclosure.

FIG. 5 is a block diagram showing a configuration example of the autonomous driving vehicle 10 according to the first embodiment. The autonomous driving vehicle 10 is provided with a control device 100, a communication device 300, and a travel device 400.

The control device 100 controls autonomous driving of the autonomous driving vehicle 10. Typically, the control device 100 is a microcomputer including a processor and a memory device 200. The control device 100 is also called an ECU (Electronic Control Unit). A control program is stored in the memory device 200. The autonomous driving control by the control device 100 is achieved by the processor executing the control program stored in the memory device 200. Moreover, the check code CKC mentioned above is stored in the memory device 200.

The communication device 300 communicates with the outside of the autonomous driving vehicle 10. More specifically, the communication device 300 communicates with the management server 20 and the user terminal 30 through the communication network. The control device 100 can communicate information with the management server 20 and the user terminal 30 through the communication device 300.

The travel device 400 includes a steering device, a driving device, and a braking device. The steering device turns wheels. The driving device is a power source that generates a driving force. The driving device is exemplified by an engine and an electric motor. The braking device generates a braking force. The control device 100 controls the travel device 400 to control travel (steering, acceleration, and deceleration) of the autonomous driving vehicle 10.

3-3. Deactivation Processing

Figure 6:
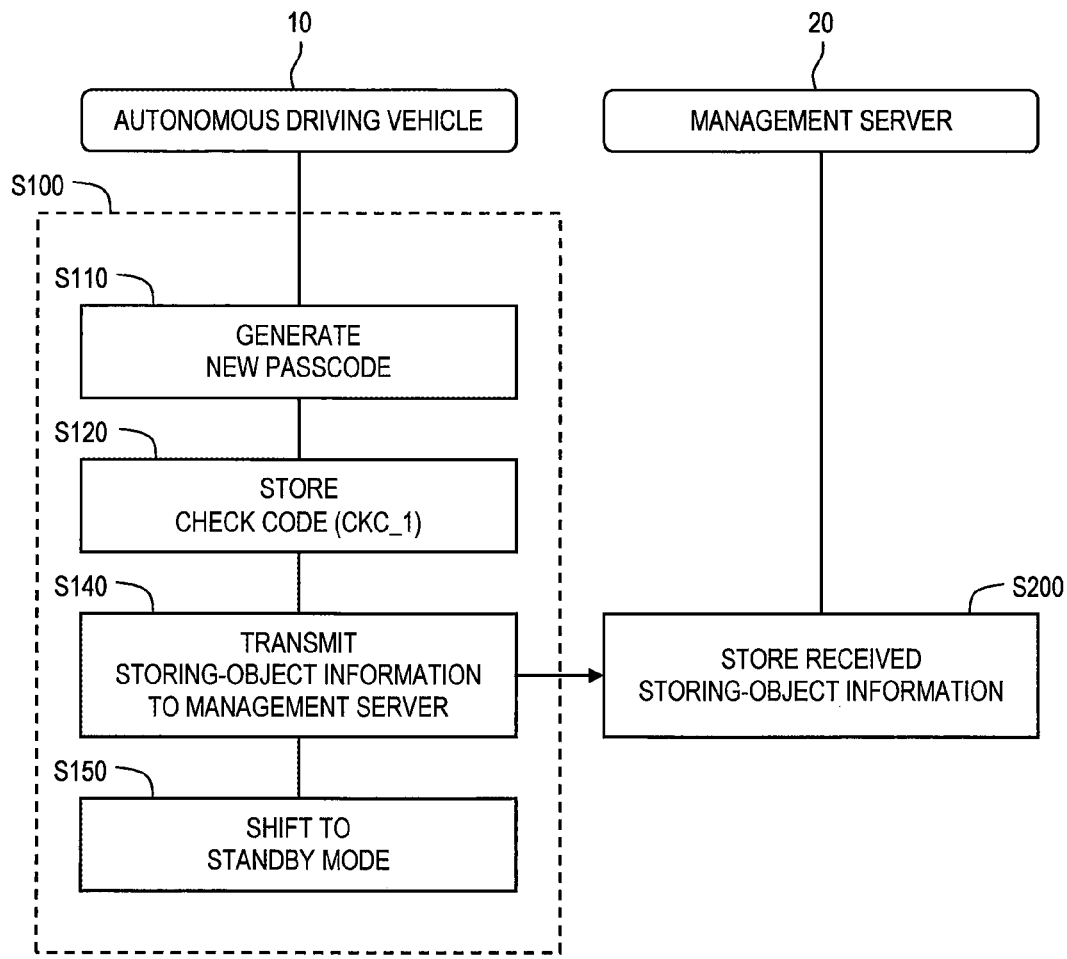
FIG. 6 is a flow chart showing a processing flow relating to deactivation processing according to the first embodiment of the present disclosure.

FIG. 6 is a flow chart showing a processing flow relating to the deactivation processing according to the first embodiment. When the autonomous driving vehicle 10 arrives at the standby position, the control device 100 performs the deactivation processing to enter the standby mode (Step S100).

More specifically, the control device 100 newly generates the passcode PSC (Step S110). The latest check code CKC including the newly-generated passcode PSC is the first check code CKC_1. The control device 100 stores the first check code CKC_1 in the memory device 200 (Step S120). Furthermore, the control device 100 uses the communication device 300 to transmit storing-object information to the management server 20 (Step S140). In the first embodiment, the storing-object information includes the first check code CKC_1. After that, the control device 100 makes the autonomous driving vehicle 10 shift to the standby mode (Step S150). For example, the control device 100 turns OFF the travel device 400.

The management server 20 receives the storing-object information from the autonomous driving vehicle 10. Then, the management server 20 stores the received storing-object information in its own memory device (Step S200). Here, the storing-object information is stored with being associated with the autonomous driving vehicle 10 as a transmission source. In other words, the storing-object information is stored separately for each autonomous driving vehicle 10. In the first embodiment, the first check code CKC_1 is stored as the stored check code CKC_S.

3-4. Abnormal Event Check Processing

Figure 7:
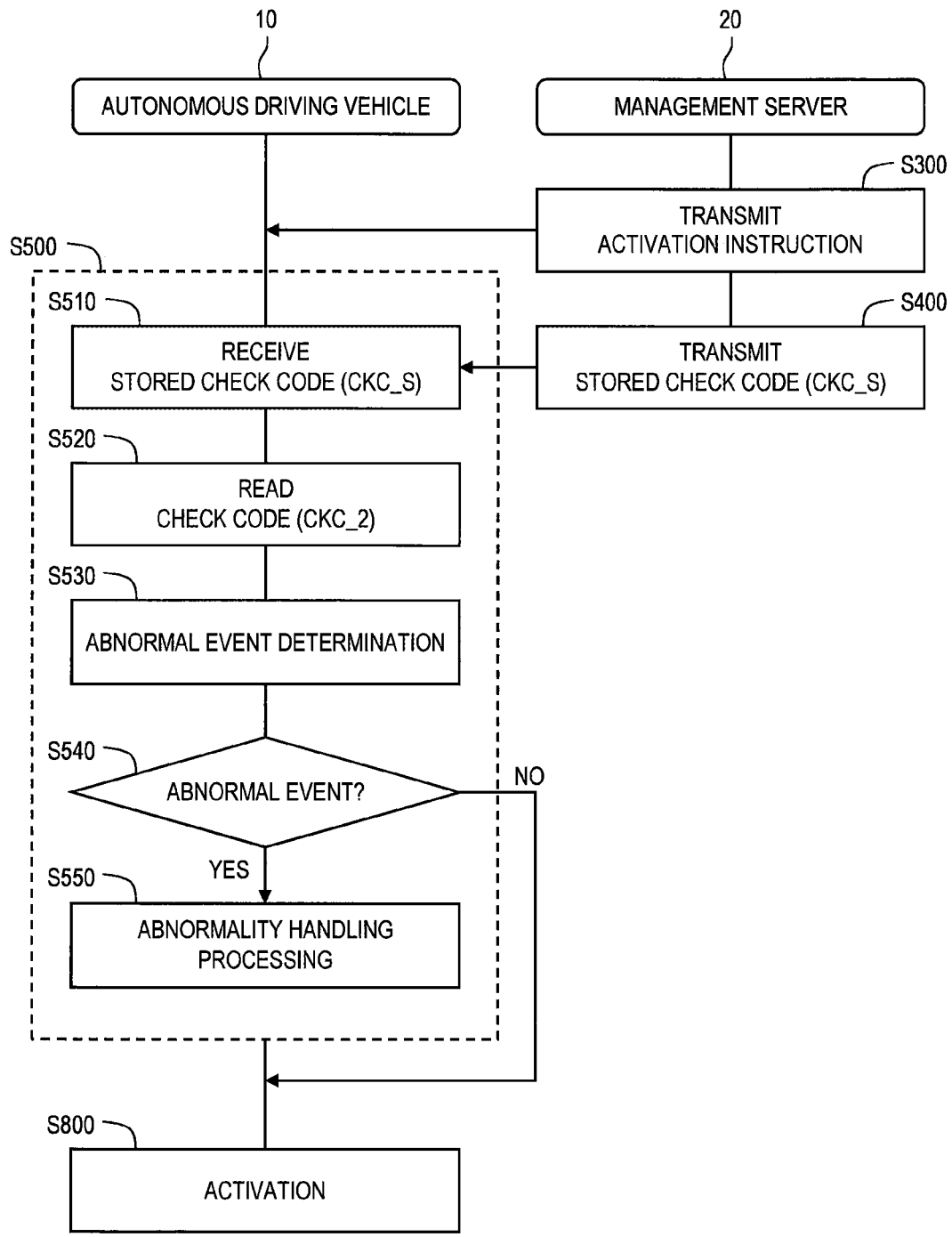
FIG. 7 is a flow chart showing a processing flow relating to abnormal event check processing according to the first embodiment of the present disclosure.

FIG. 7 is a flow chart showing a processing flow relating to the abnormal event check processing according to the first embodiment. At the time of activating the autonomous driving vehicle 10, the management server 20 transmits the activation instruction ACT to the autonomous driving vehicle 10 (Step S300).

Furthermore, the management server 20 reads the stored check code CKC_S associated with the autonomous driving vehicle 10 being an activation-target from its own memory device. Then, the management server 20 transmits the stored check code CKC_S that is read to the autonomous driving vehicle 10 (Step S400). The stored check code CKC_S may be transmitted together with the activation instruction ACT or may be transmitted after an elapse of a certain period of time after the transmission of the activation instruction ACT.

In response to the activation instruction ACT, the control device 100 of the autonomous driving vehicle 10 performs the abnormal event check processing (Step S500). More specifically, the control device 100 receives the stored check code CKC_S transmitted from the management server 20 through the communication device 300 (Step S510). Moreover, the control device 100 reads the check code CKC stored in the memory device 200, as the second check code CKC_2 (Step S520).

Subsequently, the control device 100 determines whether or not the abnormal event occurs (Step S530). More specifically, the control device 100 determines whether or not the second check code CKC_2 and the stored check code CKC_S match. Each check code CKC includes the vehicle code VID and the passcode PSC. When at least one of the vehicle code VID and the passcode PSC does not match, it is determined that the second check code CKC_2 does not match the stored check code CKC_S.

When the second check code CKC_2 and the stored check code CKC_S do not match, the control device 100 determines that the abnormal event occurs (Step S540; Yes). In this case, the control device 100 performs predetermined abnormality handling processing (Step S550). For example, the control device 100 prohibits the activation of the autonomous driving vehicle 10. In addition, the control device 100 uses the communication device 300 to notify the management server 20 of the occurrence of the abnormal event. The management server 20 reports the occurrence of the abnormal event to an operator, a security guard, and the like to urge them to deal with the abnormal event.

On the other hand, when the second check code CKC_2 and the stored check code CKC_S match, the control device 100 determines that the abnormal event does not occur (Step S540; No). In this case, the control device 100 performs the activation processing (Step S800). For example, the control device 100 turns ON the travel device 400.

3-5. Effects

According to the first embodiment, as described above, in the deactivation processing, a new check code CKC (i.e. the first check code CKC_1) is generated and stored in both the autonomous driving vehicle 10 and the management server 20. After that, at the time of activating the autonomous driving vehicle 10, the check code CKC (i.e. the second check code CKC_2) stored in the autonomous driving vehicle 10 and the check code CKC (i.e. the stored check code CKC_S) stored in the management server 20 are compared with each other.

If the second check code CKC_2 does not match the stored check code CKC_S, it means that some kind of abnormal event occurs during the standby period. For example, it may be considered that the autonomous driving vehicle 10 is hacked and data stored in the memory device 200 is maliciously changed. As another example, it may be considered that the control device 100 as a whole is replaced. By comparing the second check code CKC_2 and the stored check code CKC_S, it is possible to detect occurrence of such the abnormal event.

Moreover, each check code CKC includes two types of codes with different properties, that is, the vehicle code VID unique to the autonomous driving vehicle 10 and the passcode PSC whose value changes each time it is generated. Even if the vehicle code VID is leaked out, it is extremely difficult to know the latest passcode PSC generated immediately before the deactivation. By using both the vehicle code VID and the passcode PSC with different properties, it is possible to improve accuracy of detection of occurrence of the abnormal event.

When detecting the abnormal event occurs during the standby period, the autonomous driving vehicle 10 performs the predetermined abnormality handling processing. For example, the autonomous driving vehicle 10 prohibits the activation. As a result, it is prevented that the autonomous driving vehicle 10 in which the abnormal event occurs starts autonomous travel, for example, in order to pick up the user. The autonomous driving vehicle 10 may notify the management server 20 of the occurrence of the abnormal event. In this case, the management server 20 can report the occurrence of the abnormal event to an operator, a security guard, and the like to urge them to deal with the abnormal event.

As another example, let us consider a case where someone tries to activate the autonomous driving vehicle 10 by transmitting a fake activation instruction to the autonomous driving vehicle 10. Since the management server 20 does not transmit the activation instruction ACT, the management server 20 does not transmit the stored check code CKC_S neither. Therefore, the autonomous driving vehicle 10 does not receive the stored check code CKC_S from the management server 20. Since there is no stored check code CKC_S, the abnormal event check processing (Step S500) does not go forward and thus the processing flow does not reach the activation (Step S800). That is to say, the autonomous driving vehicle 10 is prevented from being activated by the fake activation instruction. If someone transmits a fake stored check code, it is detected by the abnormal event check processing.

According to the first embodiment, as described above, it is possible to detect the abnormal event that occurs in the autonomous driving vehicle 10 during the standby period. Moreover, it is possible to prevent the autonomous driving vehicle 10 from being activated by the fake activation instruction. These contribute to increase in confidence in the driverless transportation service. Moreover, deterioration of usefulness of the driverless transportation service is prevented.

4. Second Embodiment

In the second embodiment, we especially focus on "unauthorized driving (driving without permission)" as the abnormal event. It should be noted that an overlapping description with the first embodiment will be omitted as appropriate.
4-1. Outline In the second embodiment, "check information CKI" is used for detecting the abnormal event. The check information CKI is information that the autonomous driving vehicle 10 can acquire by using a sensor and the like.

Figure 8:
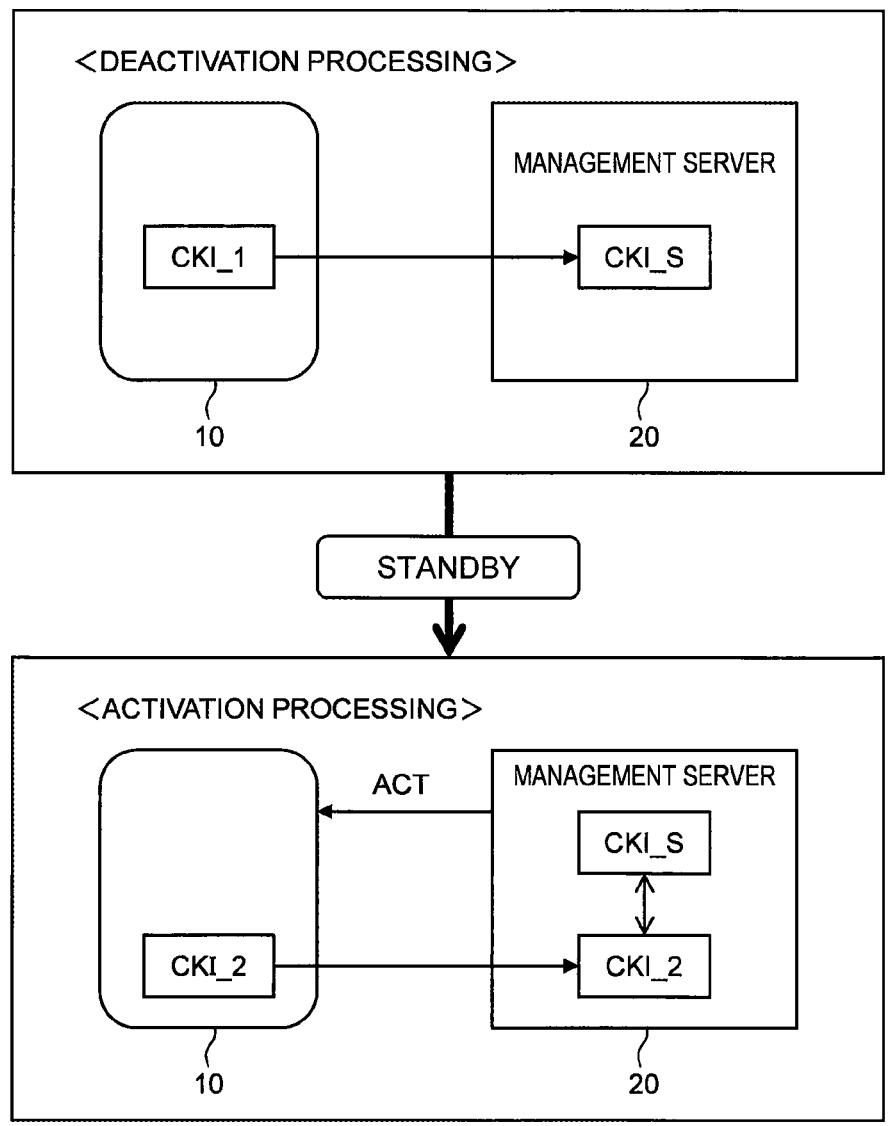
FIG. 8 is a conceptual diagram for explaining an outline of a second embodiment of the present disclosure.

FIG. 8 is a conceptual diagram for explaining an outline of the second embodiment. In the deactivation processing, the autonomous driving vehicle 10 newly acquires the check information CKI. The latest check information CKI acquired at this timing is hereinafter referred to as "first check information CKI_1". The autonomous driving vehicle 10 transmits the first check information CKI_1 to the management server 20. The management server 20 stores the first check information CKI_1 received from the autonomous driving vehicle 10, as "stored check information CKI_S".

At the time of activating the autonomous driving vehicle 10, the management server 20 transmits the activation instruction ACT to the autonomous driving vehicle 10. In response to the activation instruction ACT, the autonomous driving vehicle 10 newly acquires the check information CKI. The latest check information CKI acquired at this timing is hereinafter referred to as "second check information CKI_2". The autonomous driving vehicle 10 transmits the second check information CKI_2 to the management server 20. The management server 20 receives the second check information CKI_2.

The management server 20 performs "abnormal event check processing" that checks whether or not any abnormal event occurs during the standby period. More specifically, the management server 20 compares the second check information CKI_2 with the stored check information CKI_S to determine whether or not the autonomous driving vehicle 10 is driven without permission during the standby period. When determining that the autonomous driving vehicle 10 is driven without permission, the management server 20 performs predetermined abnormality handling processing (second abnormality handling processing). For example, the management server 20 prohibits the activation of the autonomous driving vehicle 10. The management server 20 may report the unauthorized driving to an operator, a security guard, and the like to urge them to deal with the unauthorized driving.

Figure 9:
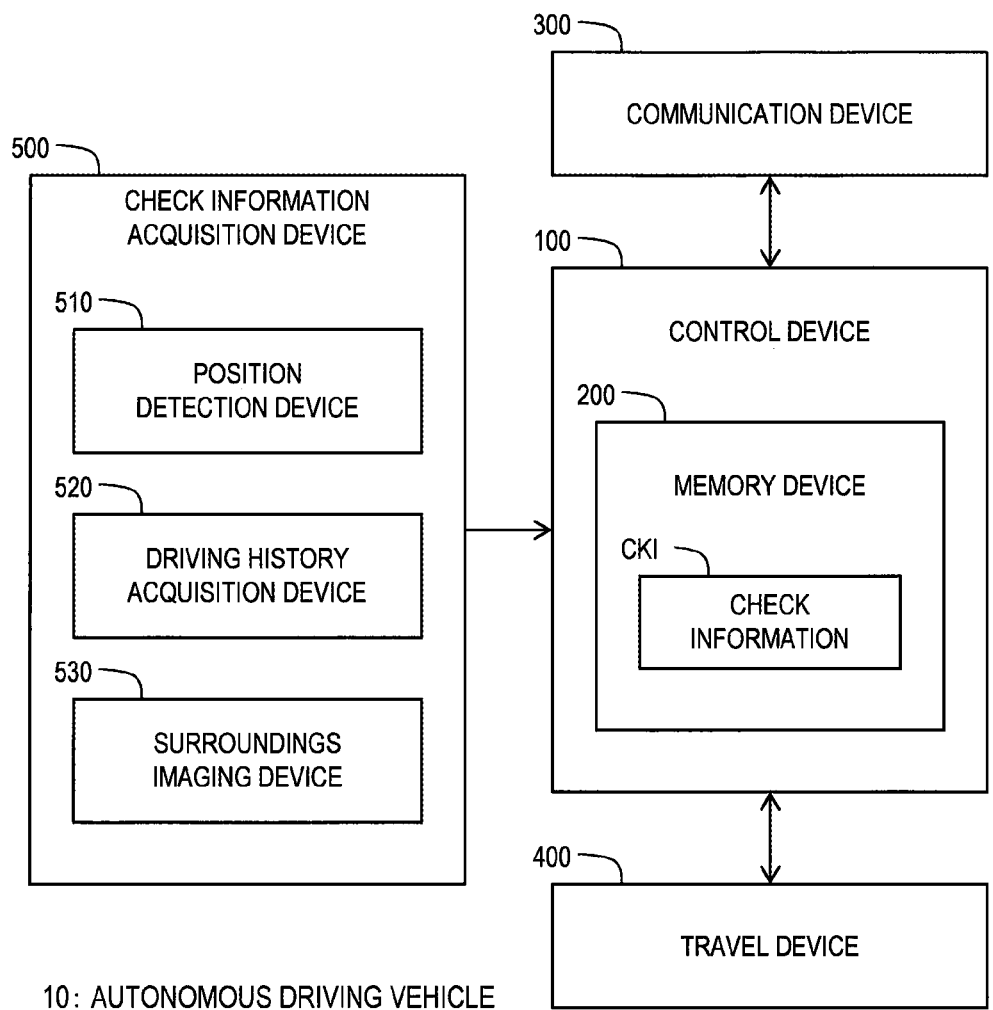
FIG. 9 is a block diagram showing a configuration example of the autonomous driving vehicle according to the second embodiment of the present disclosure.
Figure 10:
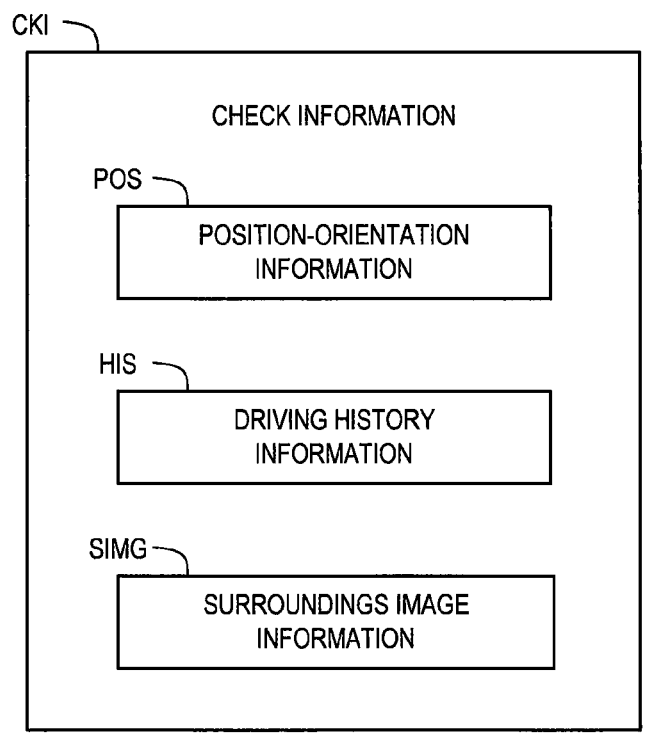
FIG. 10 is a block diagram showing an example of check information in the second embodiment of the present disclosure.

Hereinafter, an example of a configuration of and processing by the autonomous driving vehicle 10 according to the second embodiment will be described in detail.
4-2. Configuration Example of Autonomous Driving Vehicle FIG. 9 is a block diagram showing a configuration example of the autonomous driving vehicle 10 according to the second embodiment. FIG. 10 is a block diagram showing an example of the check information CKI. The autonomous driving vehicle 10 is provided with a check information acquisition device 500 in addition to the control device 100, the communication device 300, and the travel device 400 described above.

The check information acquisition device 500 is a device for acquiring the check information CKI. More specifically, the check information acquisition device 500 includes at least one of a position detection device 510, a driving history acquisition device 520, and a surroundings imaging device 530.

The position detection device 510 detects a position and an orientation of the autonomous driving vehicle 10. For example, the position detection device 510 includes a GPS (Global Positioning System) receiver. Position-orientation information POS indicates the position and the orientation detected by the position detection device 510.

The driving history acquisition device 520 acquires a driving history of the autonomous driving vehicle 10. The driving history is exemplified by a travel distance, the number of times of turning ON ignition, a steering angle, and so forth. For example, the driving history acquisition device 520 includes a wheel rotation sensor, a steering angle sensor, and so forth. Driving history information HIS indicates the driving history acquired by the driving history acquisition device 520.

The surroundings imaging device 530 images a situation around the autonomous driving vehicle 10. For example, the surroundings imaging device 530 includes a stereo camera.

Surroundings image information SIMG indicates an image around the autonomous driving vehicle 10 that is acquired by the surroundings imaging device 530.

The check information CKI in the second embodiment includes at least one of the position-orientation information POS, the driving history information HIS, and the surroundings image information SIMG. The control device 100 uses the check information acquisition device 500 to acquire the check information CKI. The check information CKI is once stored in the memory device 200. Then, the control device 100 uses the communication device 300 to transmit the check information CKI to the management server 20.

4-3. Deactivation Processing

Figure 11:
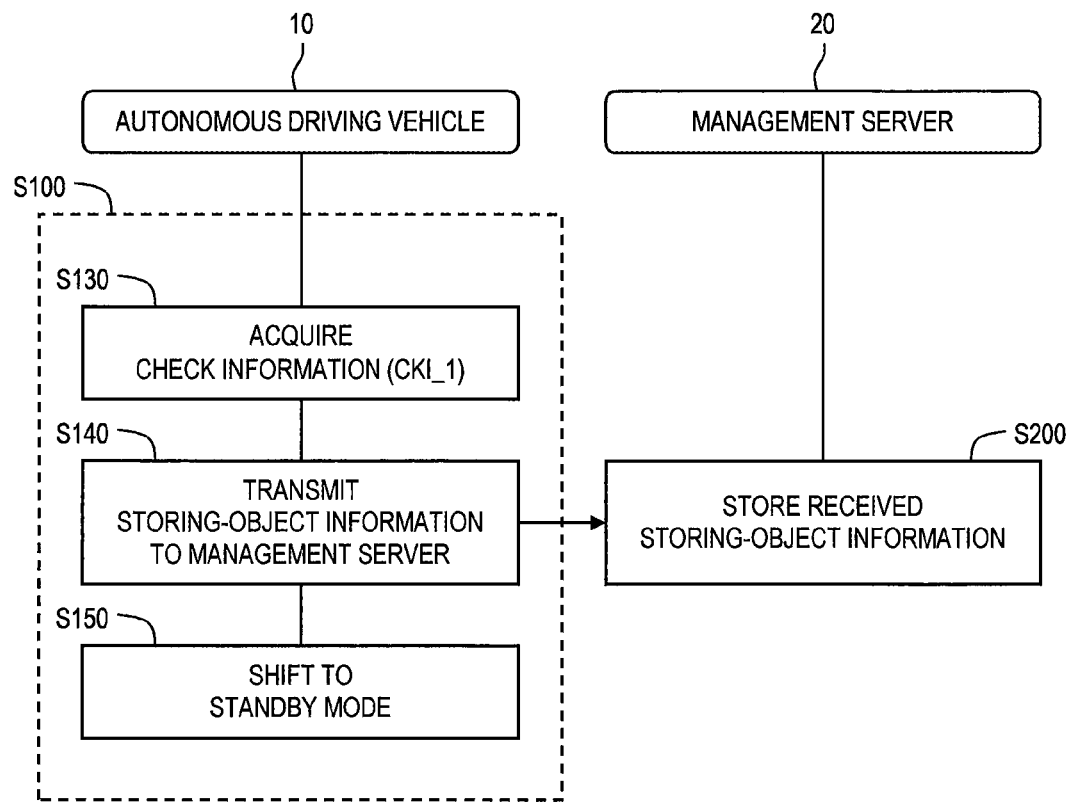
FIG. 11 is a flow chart showing a processing flow relating to deactivation processing according to the second embodiment of the present disclosure.

FIG. 11 is a flow chart showing a processing flow relating to the deactivation processing according to the second embodiment. When the autonomous driving vehicle 10 arrives at the standby position, the control device 100 performs the deactivation processing to enter the standby mode (Step S100).

More specifically, the control device 100 uses the check information acquisition device 500 to newly acquire the check information CKI as the first check information CKI_1 (Step S130). Then, the control device 100 uses the communication device 300 to transmit the storing-object information to the management server 20 (Step S140). In the second embodiment, the storing-object information includes the first check information CKI_1.

As in the case of the first embodiment, the management server 20 stores the storing-object information in its own memory device (Step S200). In the second embodiment, the first check information CKI_1 is stored as the stored check information CKI_S.

4-4. Abnormal Event Check Processing

Figure 12:
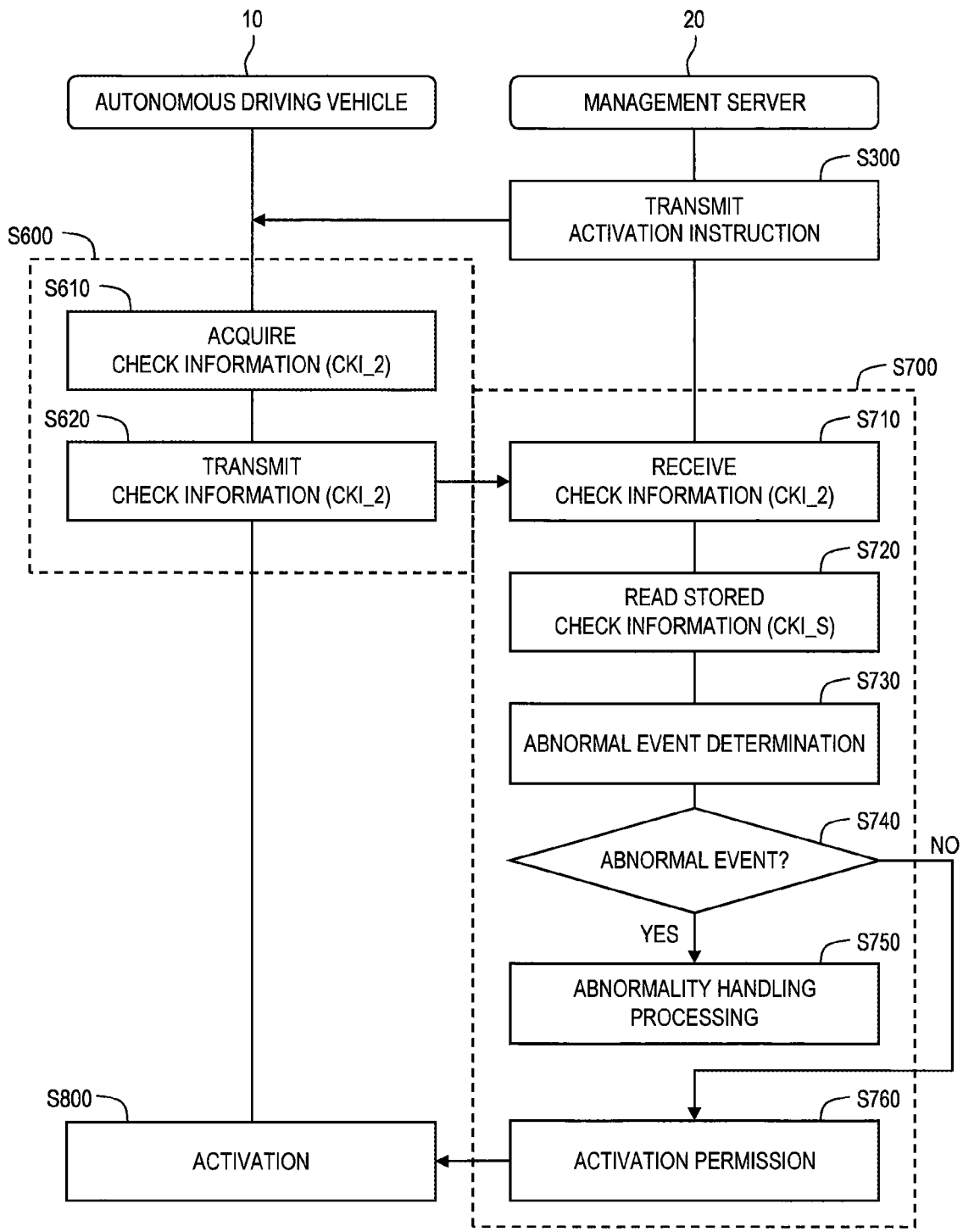
FIG. 12 is a flow chart showing a processing flow relating to abnormal event check processing according to the second embodiment of the present disclosure.

FIG. 12 is a flow chart showing a processing flow relating to the abnormal event check processing according to the second embodiment. At the time of activating the autonomous driving vehicle 10, the management server 20 transmits the activation instruction ACT to the autonomous driving vehicle 10 (Step S300).

In response to the activation instruction ACT, the control device 100 of the autonomous driving vehicle 10 performs check information acquisition processing (Step S600). More specifically, the control device 100 uses the check information acquisition device 500 to newly acquire the check information CKI as the second check information CKI_2 (Step S610). Then, the control device 100 uses the communication device 300 to transmit the second check information CKI_2 to the management server 20 (Step S620).

The management server 20 performs the abnormal event check processing (Step S700). More specifically, the management server 20 receives the second check information CKI_2 transmitted from the autonomous driving vehicle 10 (Step S710). Moreover, the management server 20 reads the stored check information CKI_S associated with the autonomous driving vehicle 10 being an activation-target from its own memory device (Step S720).

Subsequently, the management server 20 determines whether or not the abnormal event occurs (Step S730). More specifically, the management server 20 compares the second check information CKI_2 with the stored check information CKI_S to determine whether or not the autonomous driving vehicle 10 is driven without permission during the standby period (i.e. whether or not the unauthorized driving is performed).

The determination method in the case where the check information CKI includes the position-orientation information POS is as follows. The management server 20 calculates an amount of change (displacement) in the position and the orientation of the autonomous driving vehicle 10 in the standby period. When the amount of change is greater than an GPS error range, the management server 20 determines that the unauthorized driving is performed.

The determination method in the case where the check information CKI includes the driving history information HIS is as follows. The management server 20 calculates the travel distance, the number of times of turning ON ignition, or a change in the steering angle, in the standby period. When the travel distance is increased, when the number of times of turning ON ignition is increased, or when the steering angle is changed, the management server 20 determines the unauthorized driving is performed.

The determination method in the case where the check information CKI includes the surroundings image information SIMG is as follows. A target around the autonomous driving vehicle 10 includes a moving target (e.g. a pedestrian, a surrounding vehicle) and a stationary target (e.g. a sign, a building). Since a position of the moving target varies during the standby period, the management server 20 focuses on the stationary target. For example, the management server 20 compares the surroundings image information SIMG included in the second check information CKI_2 and the surroundings image information SIMG included in the stored check information CKI_S to extract a common stationary target included in both of them. When no common stationary target is found at all, the management server 20 determines that the unauthorized driving is performed. When a common stationary target is found, the management server 20 calculates an amount of change (displacement) in a position of a feature point of the common stationary target. When the amount of change is greater than a threshold value, the management server 20 determines that the unauthorized driving is performed.

It should be noted that the check information CKI includes at least one of the position-orientation information POS, the driving history information HIS, and the surroundings image information SIMG. As the number of kinds of the check information CKI used increases, accuracy of the determination in Step S730 increases.

When determining that the autonomous driving vehicle 10 is driven without permission (Step S740; Yes), the management server 20 performs the predetermined abnormality handling processing (Step S750). For example, the management server 20 prohibits the activation of the autonomous driving vehicle 10. The management server 20 may report the unauthorized driving to an operator, a security guard, and the like to urge them to deal with the unauthorized driving.

When the abnormal event is not detected (Step S740; No), the management server 20 transmits activation permission to the autonomous driving vehicle 10 (Step S760). In response to the activation permission, the control device 100 of the autonomous driving vehicle 10 performs the activation processing (Step S800). For example, the control device 100 turns ON the travel device 400.

4-5. Effects

According to the second embodiment, as described above, in the deactivation processing, the latest check information CKI (i.e. the first check information CKI_1) is acquired and stored as the stored check information CKI_S. Furthermore, also at the timing for responding to the activation instruction ACT, the latest check information CKI (i.e. the second check information CKI_2) is acquired. By comparing the second check information CKI_2 and the stored check information CKI_S, it is possible to detect the unauthorized driving of the autonomous driving vehicle 10 during the standby period.

When detecting the unauthorized driving, the management server 20 performs the predetermined abnormality handling processing. For example, the management server 20 prohibits the activation of the autonomous driving vehicle 10. As a result, it is prevented that the autonomous driving vehicle 10 in which the abnormal event occurs starts autonomous travel, for example, in order to pick up the user. The management server 20 may report the unauthorized driving to an operator, a security guard, and the like to urge them to deal with the unauthorized driving.

As in the case of the first embodiment, the second embodiment also contributes to increase in confidence in the driverless transportation service. Moreover, deterioration of usefulness of the driverless transportation service is prevented.

5. Third Embodiment

In the third embodiment, the check information CKI is used for detecting the abnormal event, as in the case of the second embodiment described above. In the third embodiment, we especially focus on "car break-in", "modification", and "destruction". It should be noted than an overlapping description with the foregoing embodiments will be omitted as appropriate.

Figure 13:
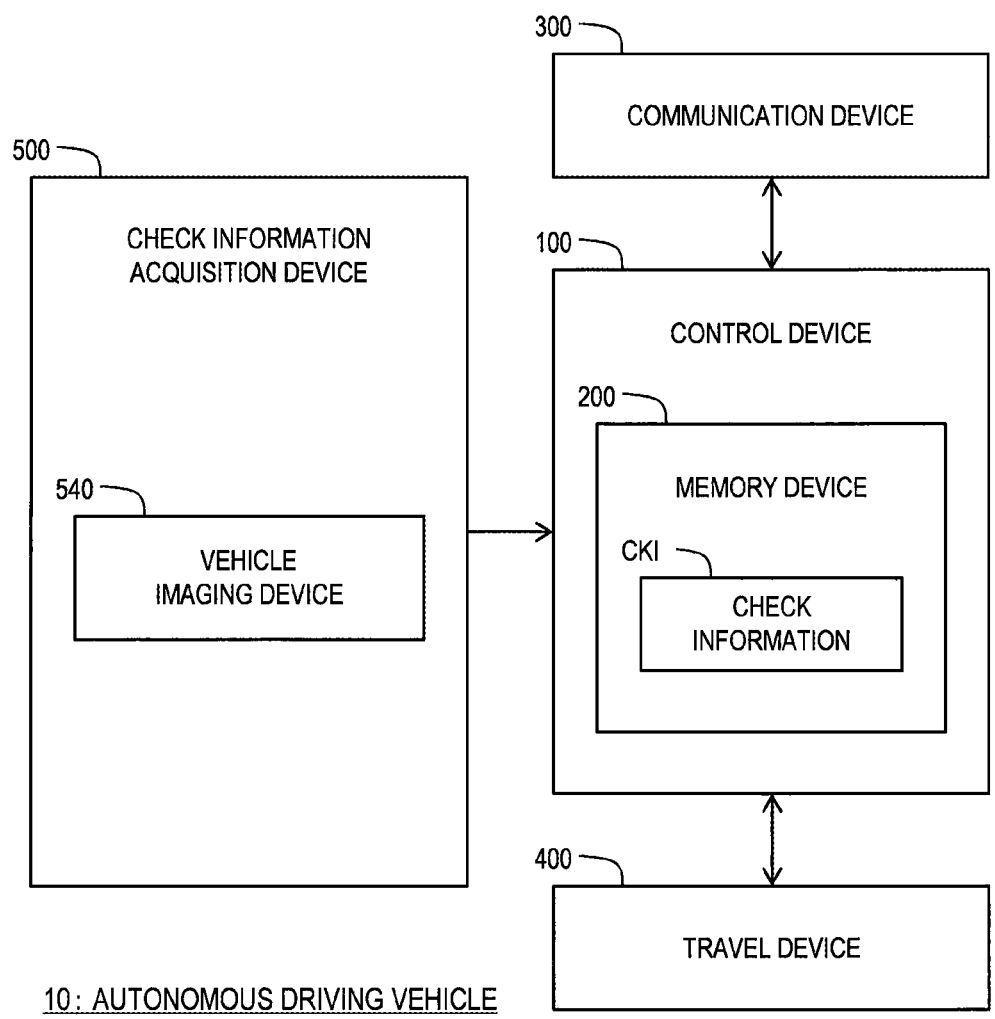
FIG. 13 is a block diagram showing a configuration example of the autonomous driving vehicle according to a third embodiment of the present disclosure.
Figure 14:
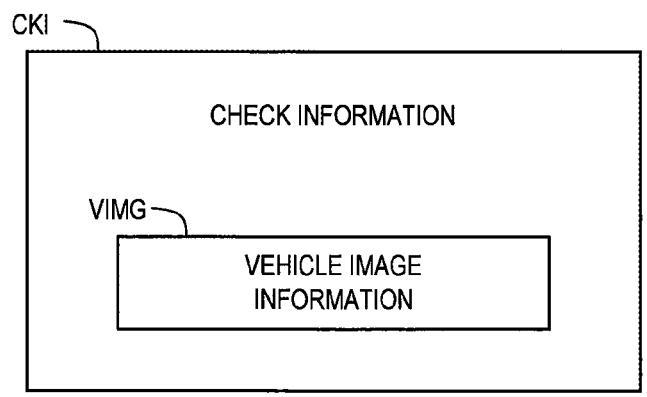
FIG. 14 is a block diagram showing an example of the check information in the third embodiment of the present disclosure.

FIG. 13 is a block diagram showing a configuration example of the autonomous driving vehicle 10 according to the third embodiment. FIG. 14 is a block diagram showing an example of the check information CKI in the third embodiment. The check information acquisition device 500 includes a vehicle imaging device 540. The vehicle imaging device 540 images at least one of a room and appearance of the autonomous driving vehicle 10. Vehicle image information VIMG indicates at least one of the room image and the appearance image acquired by the vehicle imaging device 540. The check information CKI includes the vehicle image information VIMG.

The processing flow relating to the deactivation processing is the same as that shown in the foregoing FIG. 11.

The processing flow relating to the abnormal event check processing is the same as that shown in the foregoing FIG. 12. In Step S730, the management server 20 determines whether or not a change occurs in the room or the appearance of the autonomous driving vehicle 10. More specifically, the management server 20 compares the vehicle image information VIMG included in the second check information CKI_2 and the vehicle image information VIMG included in the stored check information CKI_S to extract a difference between them. When there is a significant difference, the management server 20 determines that a change occurs in the room or the appearance of the autonomous driving vehicle 10.

When the change occurs in the room of the autonomous driving vehicle 10, the management server 20 determines that "car break-in" is performed during the standby period. When the change occurs in the appearance of the autonomous driving vehicle 10, the management server 20 determines that "modification" or "destruction" is performed during the standby period. In these cases (Step S740; Yes), the management server 20 performs predetermined abnormality handling processing (third abnormality handling processing) (Step S750). For example, the management server 20 prohibits the activation of the autonomous driving vehicle 10. The management server 20 may report the occurrence of the abnormal event to an operator, a security guard, and the like to urge them to deal with the abnormal event.

According to the third embodiment, as described above, it is possible to detect the car break-in, the modification, or the destruction during the standby period. The third embodiment also contributes to increase in confidence in the driverless transportation service. Moreover, deterioration of usefulness of the driverless transportation service is prevented.

6. Fourth Embodiment

A fourth embodiment is a combination of two or more of the first to third embodiments described above. The first and second embodiments may be combined. The first and third embodiments may be combined. The second and third embodiments may be combined. The first to third embodiments may be combined. Hereinafter, the combination of the first to third embodiments will be described an example. It should be noted that an overlapping description with the foregoing embodiments will be omitted as appropriate.

Figure 15:
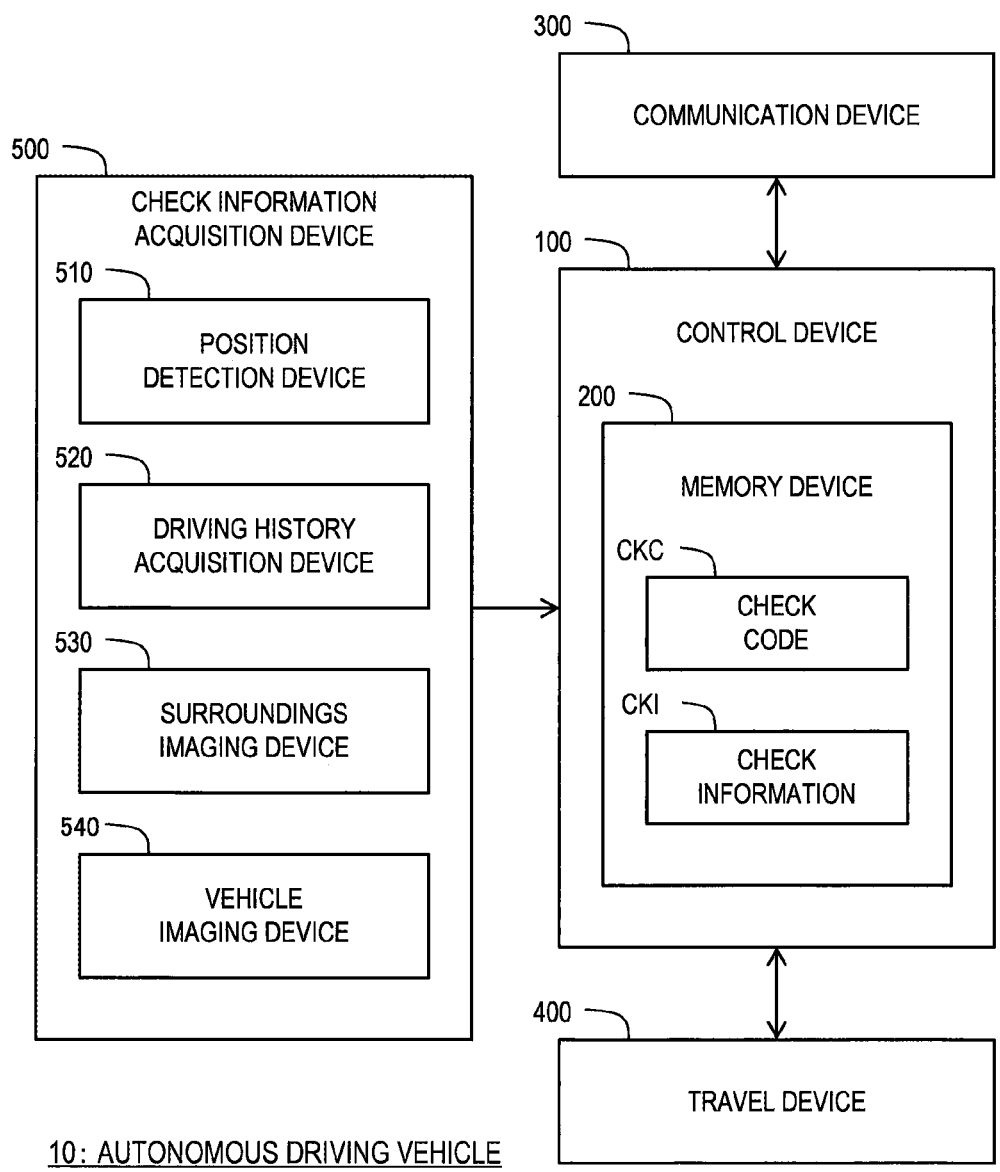
FIG. 15 is a block diagram showing a configuration example of the autonomous driving vehicle according to a fourth embodiment of the present disclosure.
Figure 16:
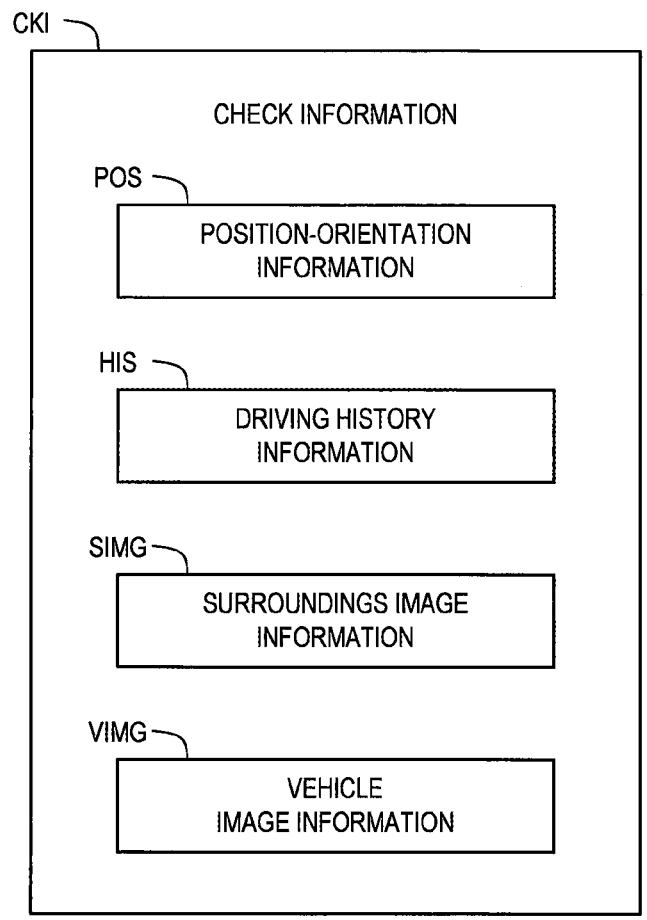
FIG. 16 is a block diagram showing an example of the check information in the fourth embodiment of the present disclosure.

FIG. 15 is a block diagram showing a configuration example of the autonomous driving vehicle 10. FIG. 16 is a block diagram showing an example of the check information CKI. The check code CKC and the check information CKI are stored in the memory device 200 of the autonomous driving vehicle 10. The check information acquisition device 500 includes the position detection device 510, the driving history acquisition device 520, the surroundings imaging device 530, and the vehicle imaging device 540. The check information CKI includes the position-orientation information POS, the driving history information HIS, the surroundings image information SIMG, and the vehicle image information VIMG.

Figure 17:
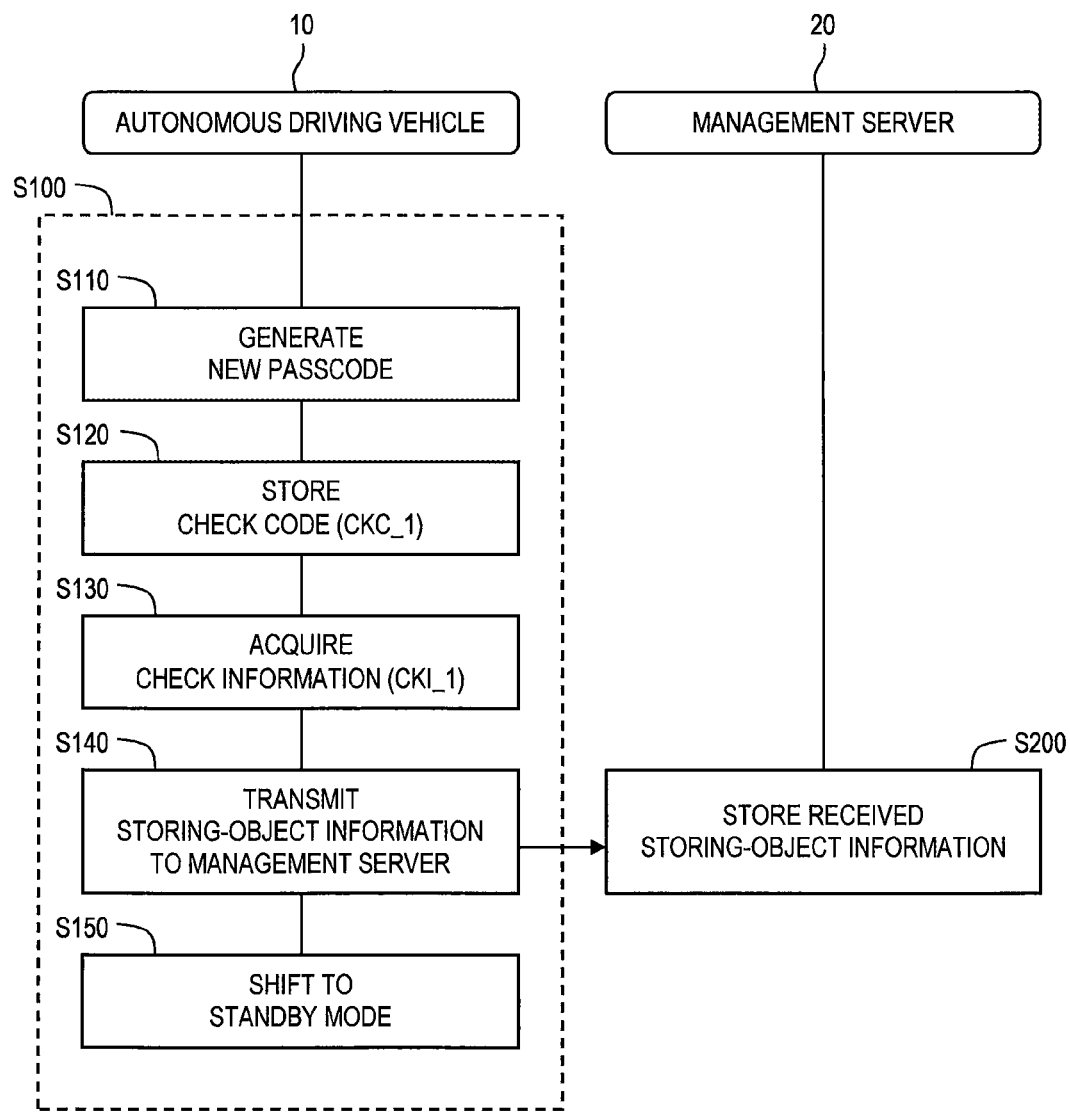
FIG. 17 is a flow chart showing a processing flow relating to deactivation processing according to the fourth embodiment of the present disclosure.

FIG. 17 is a flow chart showing a processing flow relating to the deactivation processing. Step S100 (the deactivation processing) includes Steps S110 and S120 shown in FIG. 6 and Step S130 shown in FIG. 11. The storing-object information includes the first check code CKC_1 and the first check information CKI_1. Steps S140, S150, and S200 are the same as in the case of the foregoing embodiments.

Figure 18:
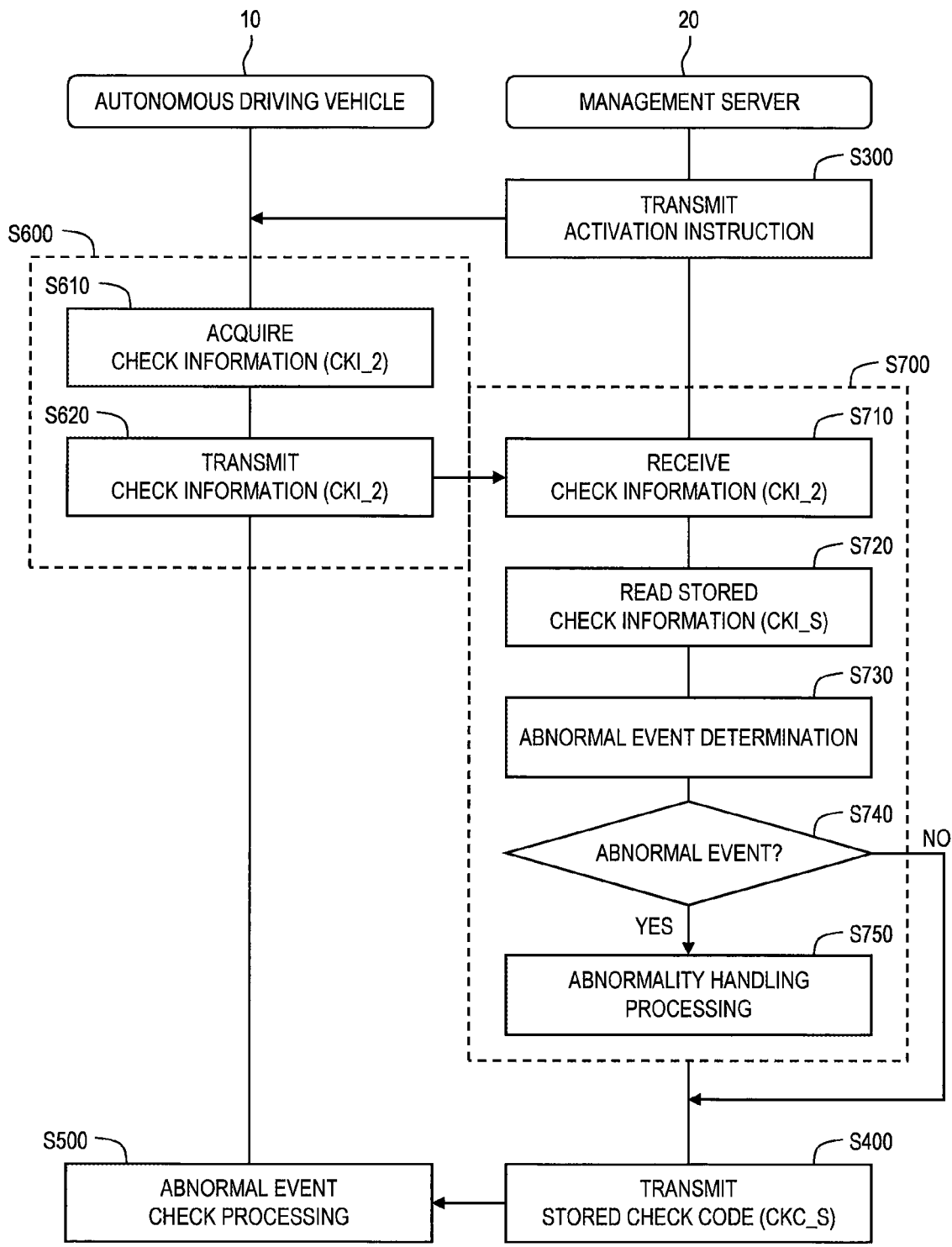
FIG. 18 is a flow chart showing a processing flow relating to abnormal event check processing according to the fourth embodiment of the present disclosure.

FIG. 18 is a flow chart showing a processing flow relating to the abnormal event check processing. Steps S300, S600, S710 to S750 are the same as those shown in FIG. 12. When the abnormal event is not detected in Step S740 (Step S740; No), the management server 20 performs Step S400 shown in FIG. 7. That is, the management server 20 transmits the stored check code CKC_S to the autonomous driving vehicle 10. After that, the control device 100 of the autonomous driving vehicle 10 performs the abnormal event check processing (Step S500).

According to the fourth embodiment, the same effects as in the foregoing embodiments can be obtained.

What is claimed is:

1. A driverless transportation system that provides a driverless transportation service, comprising:
an autonomous driving vehicle comprising a memory device; and
a remote management server managing the autonomous driving vehicle,
wherein a check code includes:
a vehicle code unique to the autonomous driving vehicle; and
a passcode whose value changes each time it is generated,
wherein in deactivation processing to enter a standby mode, the autonomous driving vehicle newly generates the passcode, stores the check code including the newly-generated passcode, as a first check code, in the memory device, and further transmits the first check code to the remote management server, and the remote management server stores the first check code as a stored check code, wherein at a time of activating the autonomous driving vehicle, the remote management server transmits an activation instruction and the stored check code to the autonomous driving vehicle, the autonomous driving vehicle, in response to the activation instruction, reads the check code stored in the memory device, as a second check code, and determines whether or not the second check code and the stored check code match, and the autonomous driving vehicle performs first abnormality handling processing when the second check code and the stored check code do not match.

2. The driverless transportation system according to claim 1, wherein check information includes at least one of position-orientation information indicating a position and an orientation of the autonomous driving vehicle, driving history information indicating a driving history of the autonomous driving vehicle, and surroundings image information indicating an image around the autonomous driving vehicle, wherein in the deactivation processing, the autonomous driving vehicle newly acquires the check information as first check information, and transmits the first check information to the remote management server, and the remote management server stores the first check information as stored check information, wherein in response to the activation instruction, the autonomous driving vehicle newly acquires the check information as second check information, and transmits the second check information to the remote management server, the remote management server compares the second check information with the stored check information to determine whether or not the autonomous driving vehicle is driven without permission, and the remote management server performs second abnormality handling processing when determining that the autonomous driving vehicle is driven without permission.

3. The driverless transportation system according to claim 2, wherein the check information further includes vehicle image information indicating at least one of images of a room and appearance of the autonomous driving vehicle, the remote management server compares the vehicle image information included in the second check information with the vehicle image information included in the stored check information to determine whether or not a change occurs in the room or the appearance of the autonomous driving vehicle, and the remote management server performs third abnormality handling processing when determining that the change occurs.

4. The driverless transportation system according to claim 1, wherein check information includes vehicle image information indicating at least one of images of a room and appearance of the autonomous driving vehicle, wherein in the deactivation processing, the autonomous driving vehicle newly acquires the check information as a first check information, and transmits the first check information to the remote management server, and the remote management server stores the first check information as a stored check information, wherein in response to the activation instruction, the autonomous driving vehicle newly acquires the check information as a second check information, and transmits the second check information to the remote management server, the remote management server compares the second check information with the stored check information to determine whether or not a change occurs in the room or the appearance of the autonomous driving vehicle, and the remote management server performs third abnormality handling processing when determining that the change occurs.

5. The driverless transportation system according to claim 1, wherein the deactivation processing comprises turning off an ignition of the autonomous driving vehicle.

* * * * *